United States Patent

[11] 3,595,289

| [72] | Inventor | James G. Greiner<br>Leola, Pa. |
|---|---|---|
| [21] | Appl. No. | 852,842 |
| [22] | Filed | Aug. 25, 1969 |
| [45] | Patented | July 27, 1971 |
| [73] | Assignee | Sperry Rand Corporation<br>New Holland, Pa. |

[54] DRIVES AND DRIVE CONTROLS FOR CONVEYORS AND BEATERS ON FORAGE WAGONS
16 Claims, 14 Drawing Figs.

[52] U.S. Cl. .................................................. 146/119,
214/83.36, 214/519, 259/41
[51] Int. Cl. ..................................................... B60p 1/38,
A01d 55/18
[50] Field of Search............................................ 146/123,
117, 118, 119, 120, 121, 122, 177, 89, 91; 96/104
R, 24 R; 259/41; 214/518, 519, 520, 83.14, 83.36

[56] References Cited
UNITED STATES PATENTS

| 3,189,202 | 6/1965 | Hansen........................ | 214/83.36 |
| 2,658,258 | 11/1953 | Hawkinson.................. | 29/78 |
| 3,214,050 | 10/1965 | McConeghy, Jr. .......... | 214/519 |
| 3,275,176 | 9/1966 | Kasten......................... | 214/519 |

*Primary Examiner*—Willie G. Abercrombie
*Attorneys*—Joseph A. Brown, John C. Thompson, James J. Kennedy and George C. Bower

ABSTRACT: The forage wagon has a main conveyor along the bottom that discharges cut crops either rearwardly through an end gate or forwardly onto a cross conveyor at the front for delivery of the cut crops to the left side of the wagon. Two input power takeoff shafts are mounted on the front of the wagon and are coupled by meshing spur gears for opposite rotation of the shafts. The power takeoff shaft is attached to one or the other depending on the desired direction of rotation of the main conveyor. The main conveyor is driven by the input shafts through a right connecting chain and sprocket drive, a belt and pulley variable speed drive, a worm box and a main chain and sprocket drive. The cross conveyor is driven by the input shafts through a separate left front chain and sprocket drive. The unloading beaters are driven from the right connecting chain and sprocket drive through a decoupling belt and pulley drive which permits a gradual application of driving torque or decoupling of the beaters when desired. The beaters have thin radial stamped projections with narrow leading edges to slice through the discharging crop material. Decoupling means are provided to disconnect the cross conveyor when the main conveyor discharges to the rear.

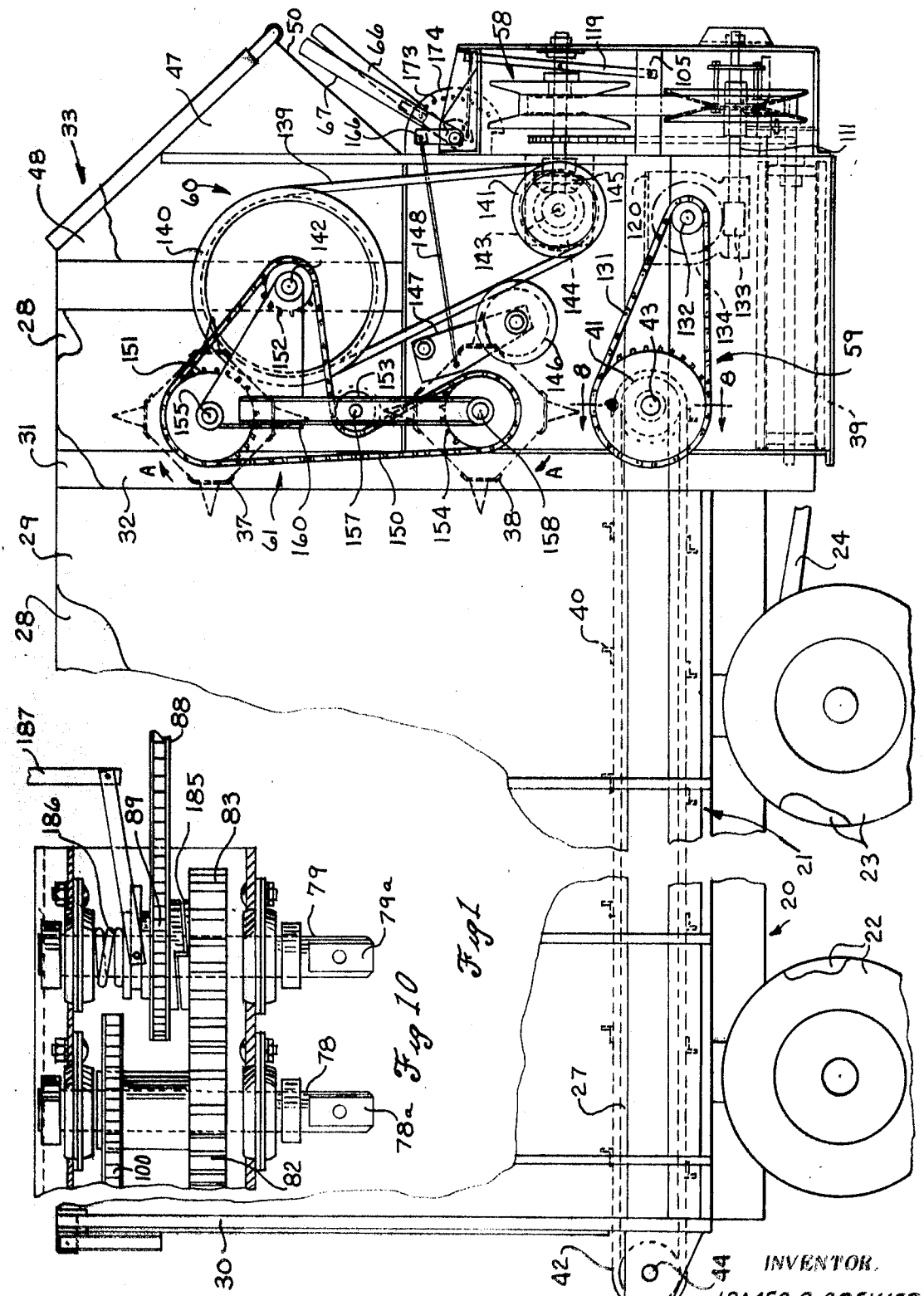

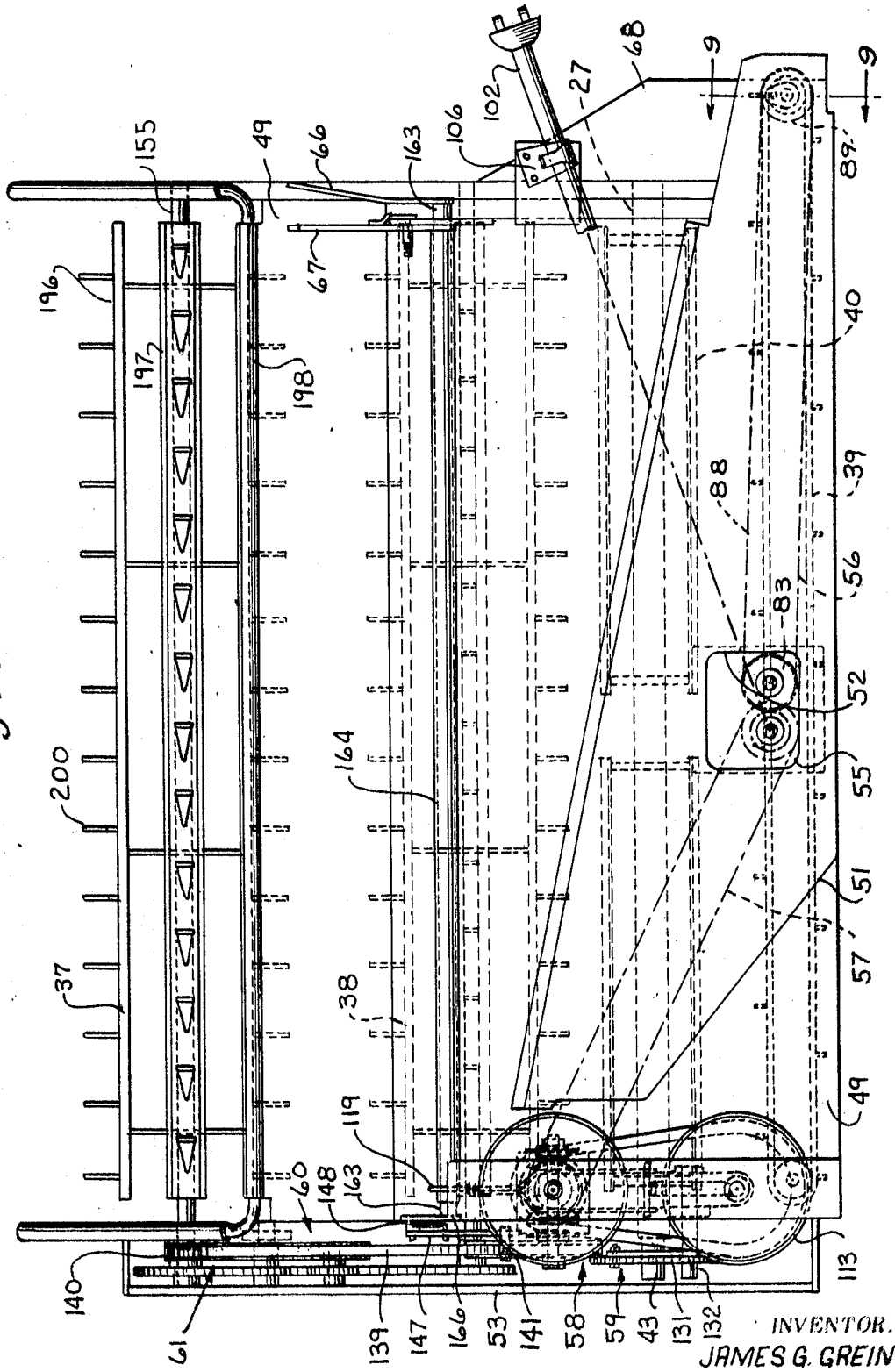

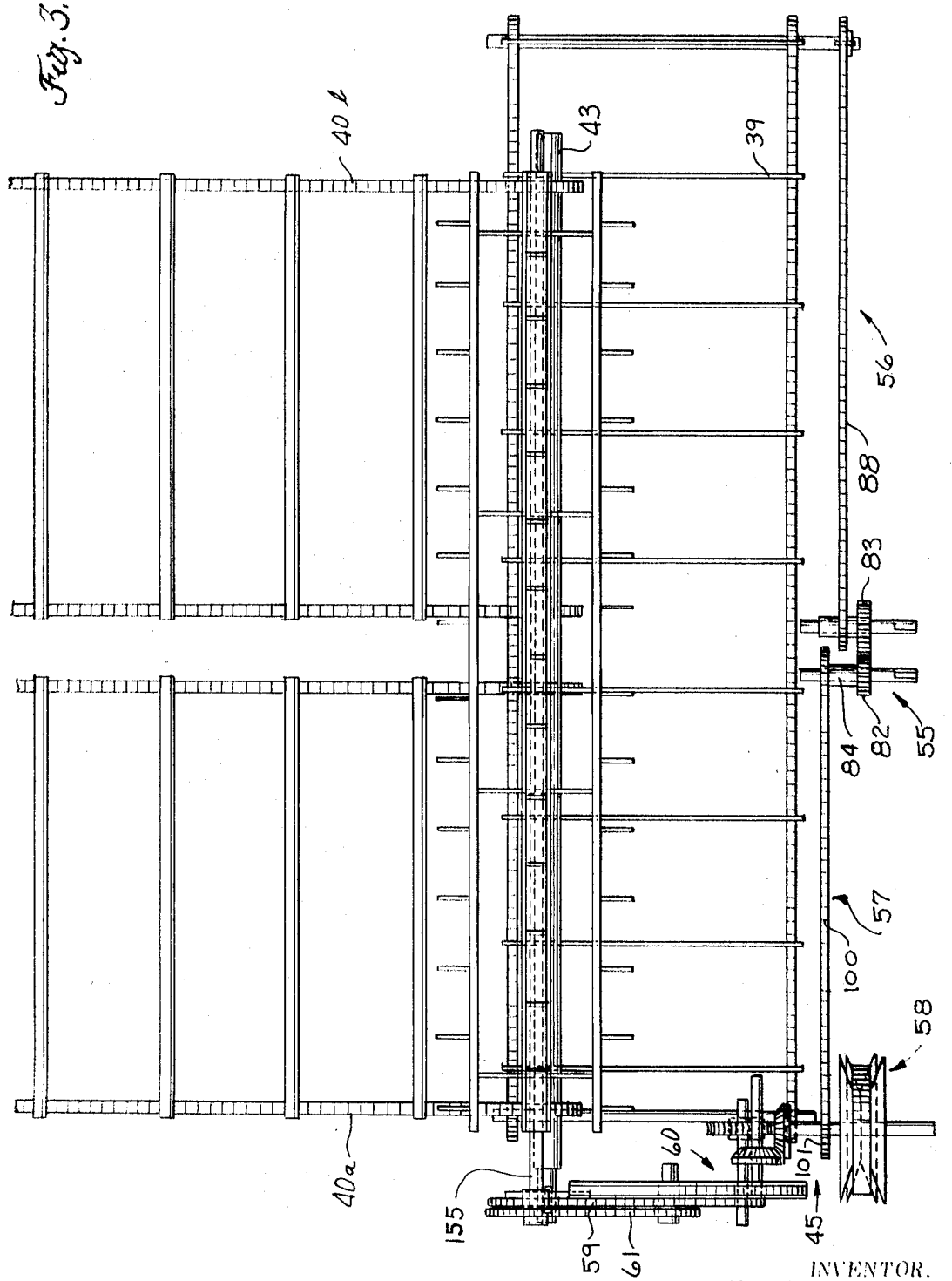

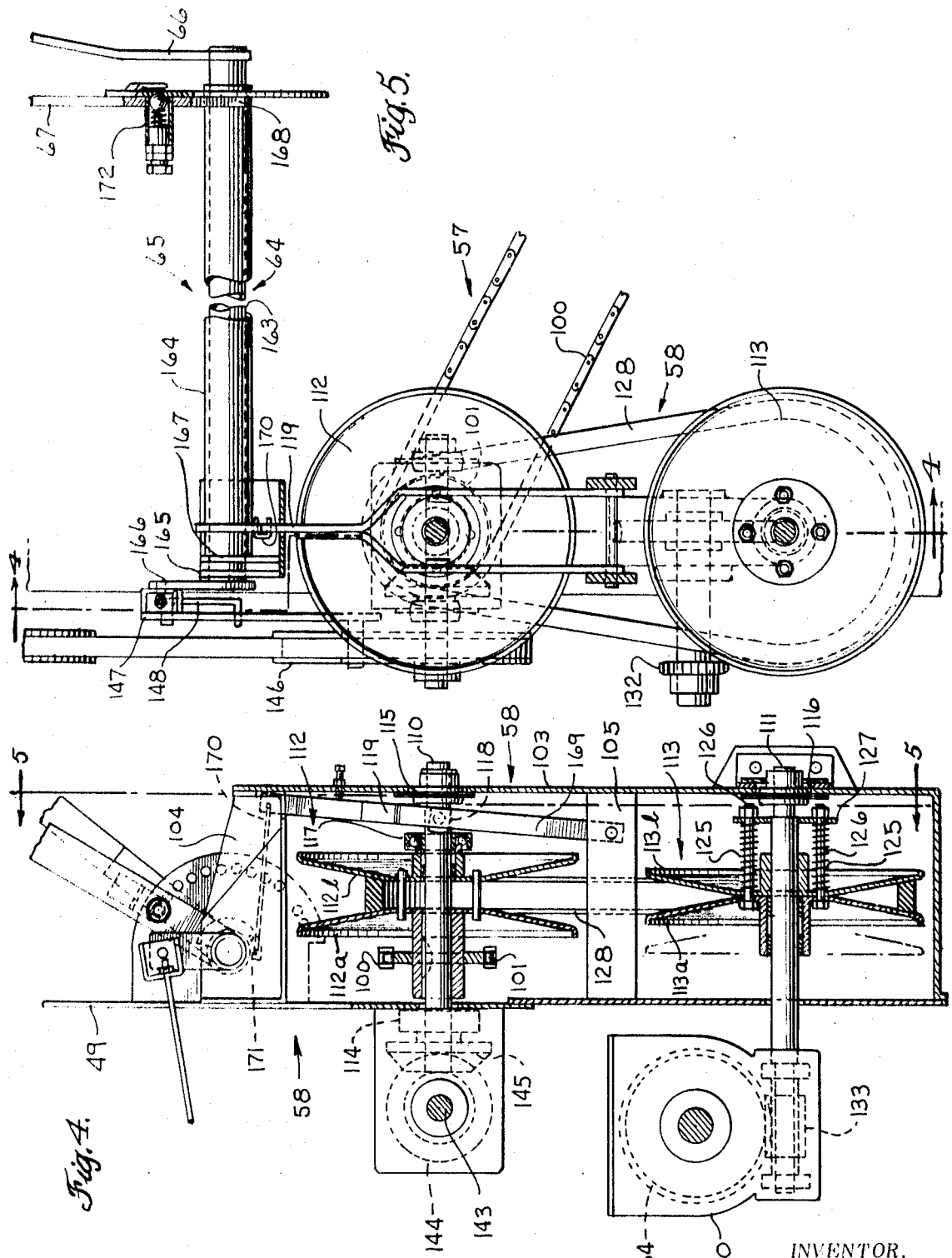

INVENTOR
JAMES G. GREINER

BY George C. Bower
ATTORNEY

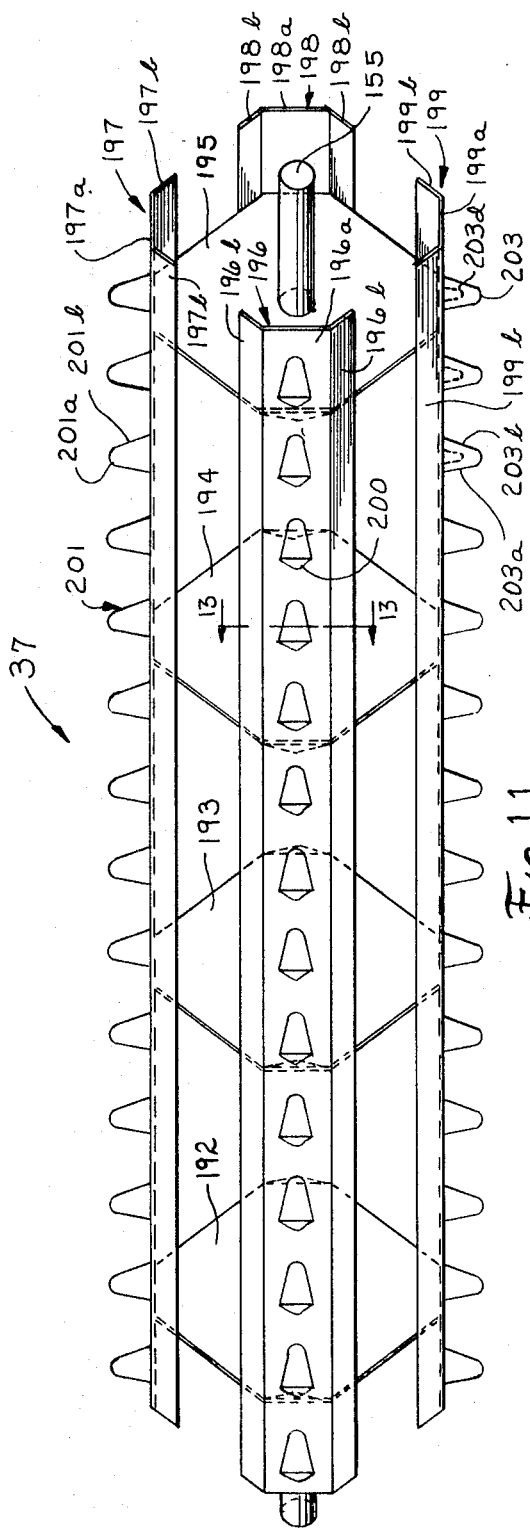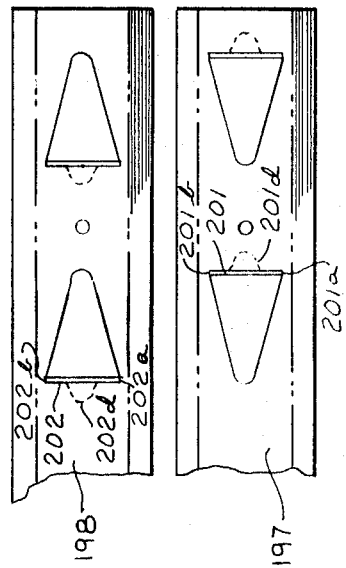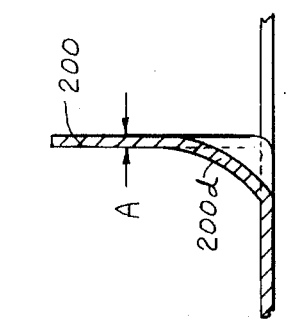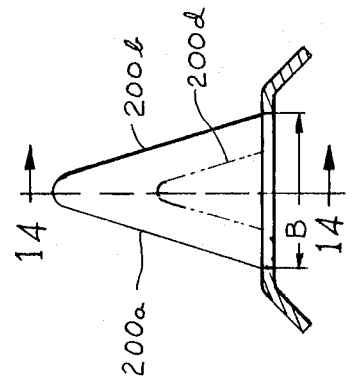

3,595,289

DRIVES AND DRIVE CONTROLS FOR CONVEYORS AND BEATERS ON FORAGE WAGONS

BACKGROUND OF THE INVENTION

This invention relates to the drives of the main and cross conveyors and the beaters on a forage wagon and to the coupling of the drives to a power takeoff shaft.

Forage wagons are usually connected to forage harvesters to receive and carry cut crops. The cut crops are carried by the wagons to storage facilities such as silos, bins and the like. On discharge from the wagon the cut crops are dropped onto a cross conveyor by the beaters with the main conveyor on the bottom moving the piled crop forwardly against the beaters. The cross conveyor feeds the crops usually to a conveying device such as a blower for depositing the crop in silo, feed bunk or the like. In other instances, the cut crop may be discharged enmasse into a trough silo or onto the ground. The crop is then discharged from the rear of the wagon by reversing the direction of movement of the main conveyor and carrying the cut crop out the back end of the wagon.

In the past the main and cross conveyors and the beaters have been driven through gears, ratchets and couplings which are complicated and time consuming for reconnection and adjustment of the wagon from front unloading to rear unloading. Further, positive coupling is used to connect the drives to single input gearbox which leaves no adjustment of power application to varying load conditions. For different speeds of operation linkages are changed. This is also the case for rear discharge by the main conveyor.

The purpose of this invention is to provide drives for the conveyors and beaters that are more versatile and adaptable to various unloading conditions, forces and speeds and permit easy reversal of the main conveyor from front to rear discharge. A further purpose is to reduce the loading on the drive means and thus the strain of the strain of the driving elements.

OBJECTS AND SUMMARY OF THE INVENTION

An object of this invention is to provide a drive system for the conveyors and beaters of a forage wagon that is readily adaptable to different unloading conditions and speeds.

Another object of this invention is to provide a drive system for the conveyors and beaters that permits easy reversal of the main conveyor between forward and rearward discharges.

Another object of this invention is to provide a forage wagon drive system that provides for an easily variable driving force to the beaters.

Another object of the invention is to provide a drive system that has multiple transmission paths for the torque applied to the conveyors and beaters.

Another object of the invention is to provide a drive system for the conveyors and beaters that avoids application of sudden and large loads to the system.

Another object of this invention is to provide an easy means for reversing the direction of movement of the main conveyor of a forage wagon unloading means.

Another object of this invention is to provide the drive for the cross conveyor with a simple and inexpensive means for decoupling the cross conveyor drive means when the main conveyor is discharging rearwardly.

In summary this invention is on a drive system comprising means for separately driving the main and cross conveyors from a dual power takeoff input and actuating the main conveyor forwardly or rearwardly depending on the connection of the dual input and decoupling the cross conveyor on rearward movement of the main conveyor and including means for separately driving the beaters through a belt and pulley decoupling drive variably applying torque to the beaters.

Other and further objects and advantages of this invention will be apparent from the following specification and appended claims taken in connection with the drawings which illustrates a preferred embodiment of the invention.

BRIEF DESCRIPTION OF THE DRAWINGS

FIG. 1 is a side view of the forage wagon illustrating the beater drive, the main conveyor drive and variable speed drive with the crop-carrying portion fragmentarily shown.

FIG. 2 is a front view of the forage wagon illustrating the beaters, the variable speed drive and the connecting drives from the two input shafts to the cross conveyor drive and variable speed drive.

FIG. 3 is a schematic top view of the drives and conveyors without the supporting frame.

FIG. 4 is an enlarged side view of the variable speed drive and controls including the control of the beater drives.

FIG. 5 is a front view of the variable speed drive and a front fragmentary view of the controls for the variable speed and beater drives taken in the direction of the lines 5-5 of FIG. 4.

FIG. 10 is a top view of the input shafts and meshing gears with the connecting drives partially shown to illustrate another embodiment of the detaching means between the input shafts and cross conveyor.

FIG. 11 is a perspective view of a beater.

FIG. 12 is a fragmentary diagrammatic representation of the relation of projections on successive beater bars.

FIG. 13 is a side view of projections taken along 13-13 of FIG. 12.

FIG. 14 is a leading edge view of a projection.

DETAILED DESCRIPTION OF THE PREFERRED EMBODIMENT

Introduction

Figure 7:
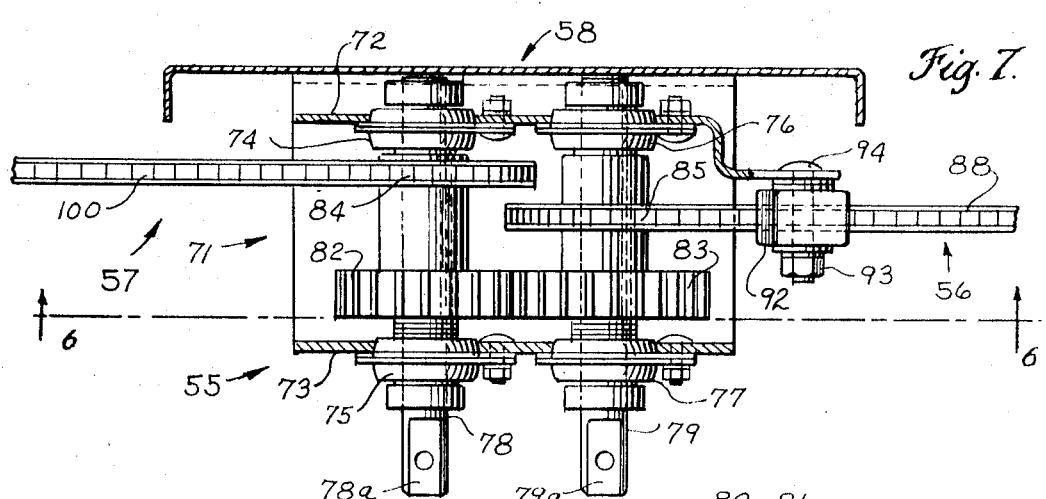
FIG. 7 is a top view of the input power shafts with the supporting frame in section along lines 7-7 of FIG. 6.
Figure 6:
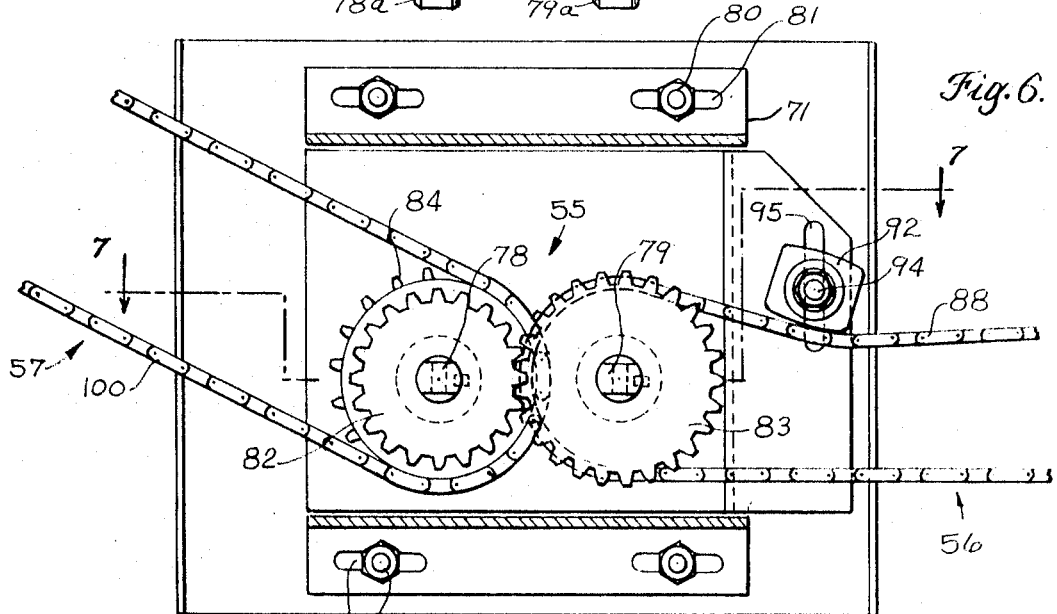
FIG. 6 is a front view of the input power shafts with the support frame sectionally viewed along lines 6-6 of FIG. 7.

Referring to FIG. 1 of the drawing the forage wagon 20 comprises a bed assembly 21 with two rear wheels 22 and two pivotally mounted front wheels 23 for movably supporting the wagon and cut crop carried thereon. A hitch 24 is connected to the front wheels 23 for attachment of the wagon to a forage harvester or the like (not shown) for pulling the wagon. The bed assembly 21 has a horizontal bottom 27 and two sidewalls 28,29 extending vertically on opposite sides of the bottom. At the rear, the sidewalls pivotally support an end gate 30 and, on front, two posts 31,32 support the frame 33 which carries the beaters 37,38, cross conveyor 39 (FIGS. 2 and 3) and the drive mechanism 45 (FIG. 3) later described herein. The main conveyor or apron 40 is formed in two sections 40a, 40b (FIG. 3) and mounted fore-and-aft on sprockets 41,42 and shafts 43,44, respectively, for carrying the main conveyor 40 on top of the bottom 27.

On the front of the wagon the frame 33 extends forwardly and supports the rotatable beaters 37,38, the cross conveyor 39 and the mechanism driving the main conveyor 40, cross conveyor 39 and beaters 37,38. The frame is securely attached to the front posts 31,32, of the wagon and has side panels 47,48 and a front panel 49 (FIG. 2). The upper portion 50 of the front panel flares forwardly to form a downwardly and inwardly sloped surface for catching and directing crop material down on to the cross conveyor 39.

The drive mechanism 45 generally comprises the dual power takeoff input 55 (FIGS. 2, 3, 6 and 7), a cross conveyor drive 56 (FIGS. 2 and 3) extending to the left side of the wagon, a variable speed connection drive 57 extending to the right side of the wagon, a variable speed drive 58 (FIGS. 2, 4 and 5), a worm box 120, a main conveyor drive 59 (FIG. 1) connected to the variable speed drive, and a decoupling belt and pulley drive 60 (FIG. 1) connected to the beater drive 61 (FIG. 1). The variable speed drive and the decoupling belt and pulley drive are manipulated by the control mechanisms 65,64, respectively, which are actuated by the handles 67,66 (FIGS. 1 and 2), respectively, on the left side of the wagon. These provide manual control of the speed and operation of the main conveyor and beaters.

On the lower left side an auxiliary conveyor 68 (FIG. 2) is pivotally mounted at the end of the cross conveyor and positioned below the cross conveyor for delivery of the cut crop to a bin, blower or the like, at the side of the wagon. The sides of the wagon may extend above the upper edges shown in FIG. 1 and may be provided with a top (not shown). A particular use of the wagon is attachment to a forage harvester to receive cut crops discharged by the harvester through the space over the beaters. The wagon is filled from front to rear at a level above the top beater.

On front discharge the beaters are rotated to cascade the cut crop forwardly onto the cross conveyor below. The main conveyor moves the pile of cut crop forwardly against the beaters to continually feed crop material to the beaters. The beaters 37 and 38 are one form of an agitating and fluffing means which regulates the flow of crop material from the pile on the wagon as the main conveyor moves the crop material forward. The cross conveyor carries the material to the left side of the wagon and drops it onto the extension conveyor 68 for discharge to a feed blower or the like. The speed and operation of the beaters and main conveyor may be controlled by an operator manipulating the control levers 66,67 as the material is discharged from the extension conveyor.

On rear discharge, the beaters, cross conveyor and extension conveyor are not operated. Only the main conveyor 40 is operated and is driven rearward by changing the connection to the dual input. The crop material is rapidly discharged past the end gate 30.

Dual Input

The dual input connection 55 has a support 71 (FIG. 7) fastened to the front panel 49 by fastening means 80 in slots 81. The support 71 has longitudinally spaced vertical members 72,73 with bearings 74,75 and 76,77 supporting input shafts 78,79, respectively, extending forwardly and having power takeoff connections 78a, 79a. Gears 82,83 and sprockets 84,85 are keyed to the shafts 78,79, respectively. The chain 88 forms with the sprocket 85 and sprocket 89 (FIGS. 2, 8 and 9) the cross conveyor drive 56. An adjustable shoe 92 secured by nut 93 and bolt 94 in slot 95 to the member 72. The shoe takes up slack in the chain 88.

The chain 100 meshes with the sprocket 84 and sprocket 101 (FIGS. 4 and 5) to form the coupling drive 57 between the dual input connection 55 and the variable speed drive 58 and the bevel gears 62 connected to the decoupling drive 60.

The gears 82,83 are continuously in mesh so that both shafts are rotated when either one is driven by the power takeoff coupling shaft 102, shown in transport position in FIG. 2. The direction of rotation is opposite. The shaft is held in bracket 106 secured to the front wall 49. The ratio of the gears are set so that gear 83 is larger to step up the gear ratio on the rearward movement of the main conveyor and slow down the speed of the cross conveyor on front unloading.

The cover 51 (FIG. 2) is secured to the front panel 49 to isolate the dual input connection, cross conveyor drive and variable speed drive connection. An opening 52 is provided for the input shafts 78,79.

Variable Speed Drive and Control

An L-shaped bracket 103 mounted on the front panel 49 of the casing 33, by the support members 104 and 105, supports the forward ends of the drive shafts 110,111 of the variable speed drive 58. The drive has two horizontal longitudinally extending shafts 110,111 (FIG. 4) supporting the variable sheaves 112,113, respectively. The upper shaft 110 is rotatably mounted in bearings 114,115 mounted in the front frame panel 33 and the front vertical casing support member 103. The lower shaft 111 is rotatably mounted in bearing 116 on the casing 103 and the worm box 120 securely attached to the side 47 of the frame 33.

The upper sheave 112 has the rear half 112a fixedly mounted on the shaft 110 with the sprocket 101 of the coupling drive 57 securely mounted thereto to rotate the sheave 112. The other half 112b is slideably mounted on the shaft and has a ball bearing 117 for engagement by the shoe 118 on the adjusting lever 119 of the control mechanism 64.

The lower sheave 113 has the forward half 113b fixed and the rear half 113a slideable on the shaft 111. The springs 125 and rods 126 with the backing member 127 urge the halves together against the pressure of the V-belt 128 drivingly coupling the two sheaves 112,113.

Main Conveyor Drive

The main conveyor 40 has a front shaft 43 (FIGS. 1 and 8) extending laterally across the front of the wagon at the end of the bottom wall 27. The shaft 43 is rotatably journaled in bearings 130 (FIG. 8) attached to the frame. On the right end of the shaft is a large sprocket 129 which is coupled by chain 131 (FIGS. 1 and 8) to a smaller sprocket 132 on the worm box 120 (FIGS. 1 and 4). The smaller sprocket 132 is driven by the worm 133 and worm gear 134 with the worm gear being connected to the lower shaft 111 of the variable drive 58. Thus the driving power to the main conveyor passes from the sprocket 84 on the dual input to the sprocket 101 on the upper sheave half 112a of the variable speed drive through the chain 100. The belt 128 of the variable drive transmits the power to the lower sheave 113 and the lower shaft 111. The worm 133 receives the power from the lower shaft 111 and transmits it via the worm gear 134 and sprocket 132 to the main conveyor drive chain 131 passing around the larger sprocket 129 on the main conveyor shaft 43.

Beater and Beater Decoupling Drive

The beater drive 61 and the decoupling drive 60 are mounted on the right side panel 29 as shown in FIG. 1. The beater decoupling drive has two pulleys 140,141 mounted on rotatable shafts 142,143, respectively. The lower shaft 143 has a bevel gear 144 meshing with bevel gear 145 on the upper shaft 110 of the variable speed drive 58 (FIG. 4). The upper pulley 140 has a larger diameter than the lower pulley 141 and is spaced upwardly from the lower pulley 141 to provide a span for the belt 139 coupling the pulleys to be engaged by the control idler pulley 146 rotatably mounted on bracket 147 pivotally supported on the side panel 29. The bracket 147 is connected by rod 148 to the control mechanism 65. On forward movement of the pulley 146 the belt is tightened and the upper pulley is driven. The arm 166 pivots with the inner shaft 163 and passes center to lock the bracket 147 and arm 166 in the driving position. The handle 66 does not need to be held by the operator. On rearward movement the belt is slackened and slips on the lower pulley so that the upper pulley is not driven.

The beater drive 61 has a chain 150 meshing with the four sprockets 151,152,153 and 154 mounted and keyed to shafts 155, 142, 157 and 158, respectively, rotatably supported by the right side panel and the fixed bracket 160. The shafts 155 and 158 are attached to the beaters 37 and 38, respectively, and the shaft 142 is also keyed to the large pulley 140 of the decoupling drive. The shaft 157 supports the idler sprocket 153. The beaters are coupled to the input shafts by the drive 57, decoupling drive 60 and the beater drive 61 so that the beaters rotate in the direction of arrows A in FIG. 1. This rotation is upward on the rearwardly facing side and downwardly on the forwardly facing side so that the crop material is carried upwardly and then downwardly in front to form a cascade of crop material dropping down onto the cross conveyor below.

A hinge-mounted cover 53 on the side panel 29 isolates the main conveyor drive, decoupling drive, beater drive and the various controls.

Drive Controls and Decouplers

The variable speed drive 58 and the decoupling drive 60 are varied by control mechanisms 65 and 64 actuated by levers 67 and 66, respectively, at the left side of the wagon. The control mechanisms 64,65 have two concentric shafts 163,164, respectively. The inner decoupling shaft 163 is mounted at the drive end in bracket 165 and support throughout its length in the outer shaft 164 and has an arm 166 at the drive end extending radially upward. The rod 148 is pivotally connected at the extreme end of the arm 166 at one end and to the pivotal bracket 147 at the other end. The inner decoupling shaft 163 rotates freely and is held in coupling position by forward retention of the lever 66.

The outer variable speed shaft 164 is rotatably mounted in brackets 167,168. The control lever 119 is pivotally mounted at the lower end to support member 105 and at the upper end by rod 170 or a flexible linkage to the arm 171. At the other end the actuating lever 67 has a spring-loaded ball detent 172 indexing a series of arcuately arranged openings 173 in the bracket 174 secured to the front panel. Thus the variable speed drive may be set a number of speed ratios.

Figure 8:
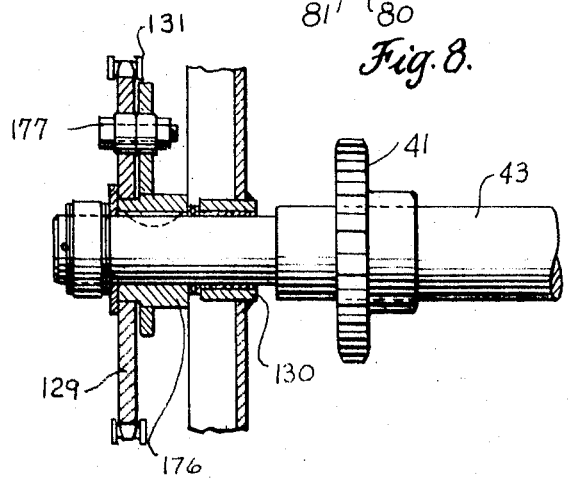
FIG. 8 is a fragmentary view of the main chain and sprocket drive and main conveyor drive sprockets and shafts taken along lines 8-8 of FIG. 1 for illustrating the shear bolt connection.

In FIG. 8 an enlarged detail view of the front main conveyor shaft 43 and sprocket 41 is shown. The sprocket 129 of the main conveyor drive 59 (FIG. 1) is rotatably mounted on the collar 176 keyed to the main conveyor drive shaft 43. The sprocket 129 is connected to the collar by a shear bolt 177.

Figure 9:
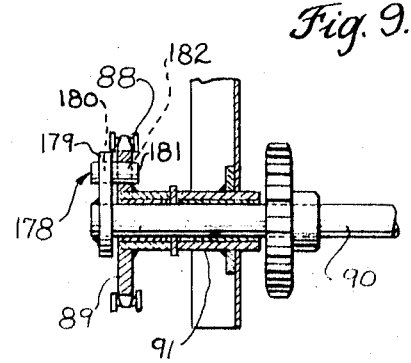
FIG. 9 is a fragmentary view of the front chain and sprocket drive and cross conveyor drive sprockets and shafts taken along lines 9-9 of FIG. 2 illustrating the detach means between the drives.

When the main conveyor 40 is driven rearwardly, the cross conveyor drive 39 also reverses. To prevent this reverse movement of the cross conveyor, decoupling means 178 are provided between the input shaft 79 and the cross conveyor 39. In FIG. 9 an enlarged fragmentary sectional view of the left sprocket 89 of the drive and the cross conveyor. The shaft 90 of the conveyor is rotatably supported in the bearing 91 and the sprocket is rotatably mounted on the end of the shaft. A radial arm 179 welded to the shaft 90 has a hole 180 through which the pin 181 is fitted into a corresponding hole 182.

In FIG. 10 another embodiment of the decoupling means is shown in which the gear 83 has one half of a jaw clutch 185 attached thereto. The sprocket 89 has the other half of the clutch and are slidably mounted on shaft 79 and urged into engagement with the other half by a spring 186. When the power takeoff shaft 102 is attached to shaft 78 the shaft 79 is rotated in the clockwise direction and the jaws of the clutch engage and the cross conveyor is driven. When the power takeoff shaft is attached to the shaft 79 and rotated counterclockwise the jaws slip if the operator has not disengaged the clutch jaws by the lever 187 having one end riding in the groove on the sprocket. The sprocket rotates on the shaft. On rearward discharge the pin 178 is removed and the sprocket 89 spins on the shaft 90 and the cross conveyor remains stationary.

Beater and Beater Bars

In FIGS. 2, 3 and 11 the upper beater 37 is illustrated. The lower beater 38 is identical to the upper beater, therefore, only the upper beater will be described in detail. The beater has four identical beater bars 196, 197, 198, 199 mounted on the supporting shaft 155 by the four identical support members 192, 193, 194, 195 axially or longitudinally spaced along the shaft and securely affixed in perpendicular relation thereto. The bars, support members and shaft form a cagelike structure which is rigid and strong for transmission of torque and load carried by the beaters. The support members are planar stamped sheet metal pieces.

The beater bars are also formed from sheet metal and have longitudinally extending central portions 196a, 197a, 198a, 199a. The particular feature of these beater bars is the teeth or projections 200, 201, 202, 203 extending outwardly from the bar. The projections are stamped from the central portions and bent normal to the bar and central portion so as to extend outwardly and, in this embodiment, radially to the beater. The preferred shape of the projection is triangular with the base having the greatest width B attached to the central portion. Ribs 200d, 201d, 202d, 203d are formed in the respective projections and central portions to stiffen the projections. The bars have longitudinal edge portions 196b, 197b, 198b, 199b bent inwardly at an acute angle to stiffen the bar and cooperating with the ribs on the projections to assist in the stiffening of the teeth or projections.

The projections have a thickness A which is substantially less than the width of the base B so that the teeth are thin for cutting through crop material. The teeth are oriented in planes normal to the shaft 155 with the thin edges 200a, 201a, 202a, 203a leading the respective projections and the edges 200b, 201b, 202b, 203b trailing. The triangular shape of the projections imparts a triangular configuration to the ribs and the openings 196c, 197c, 198c, 199c in the respective bars. The openings have length approximately half the distance between the projections. The beater bars are identical with following bars reversed in position as illustrated with bars 197,198 in FIG. 12. This offsets the teeth of adjacent bars so that as the beaters rotate the following teeth cut a different path through the crop material from the preceding teeth.

In previous beaters radially extending rods were attached to the shaft. These rods were long and created a large resistance to the initial starting of the beaters on unloading a forage wagon. The crop material packs around the beaters. The torque required to turn the beaters exceeded the limit of the shear bolt causing rupture or causing the drives to break. The present thin teeth are also short and slice through the packed crop material without creating excessive torque yet breaking the material up for a generally even flow or delivery of crop material to the cross conveyor. The edge portions cooperate with the teeth in agitating and fluffing the crop material.

The present beaters are also less expensive to manufacture. Three basic elements are required and these are the shaft, beater bar and support member. The support members are stamped from sheet metal as well as the beater bars. The teeth ribs and edge portions are formed in the same stamping and punching process. Thus the present beaters are stronger, less expensive and require lower torque for rotation.

Operation

The forage wagon 20 may be hitched to a forage harvester drawn by a tractor with the spout of the harvester directed towards the opening above the top beater 37 for delivering the cut crop or crop material to the storage space on the wagon. When the wagon is fully loaded it is unhitched from the harvester and is drawn to storage facilities. These facilities may require delivery of the crop material at a given rate to a blower or the like or delivery as rapidly as possible such as to a storage trench. When the material is to be delivered at a given rate it is discharged at the front and when a rapid delivery is desired the material is discharged from the rear of the wagon. On front delivery the extension conveyor is pivoted into lower position overhanging a blower or conveyor and delivers material for storage or use. The operator stands at the left side next to the extension and operates the control levers 66,67. The crop material may initially be jammed around and in the beaters rendering them difficult to start. The lever 66 may be gradually actuated to slowly render the decoupling belt and pulley drive operative and slowly apply load of the beaters on the drive system. The lever 67 may also be actuated to start the variable speed drive and the main conveyor. The cross conveyor starts moving as soon as power is applied to the input shafts. Thus the operator watches the discharge of the crop material and sets the speed of the main conveyor or stops the main conveyor as desired. The lever 66 may be pulled over center for continuous rotation of the beaters.

For rear discharge of the crop material the power takeoff attachment is connected to the other input shaft. However, before starting, the coupling pin 178 is removed so that the cross conveyor will not operate. The beater control lever is set in the nonoperative position. The main conveyor control lever may be set at any of the given positions depending on the discharge desired.

Features of the Invention

The drive mechanism previously described has many novel advantages. The power paths to the main conveyor and beaters separate at the sprocket or upper shaft of the variable speed drive so that the coupling drive 57 is the only element transmitting the forces for both drives. This greatly reduces the possibility of failure and this coupled with the control of the application of power to the beaters reduces the possibility of the application large forces and torques to the drive system. The operator can gradually apply the driving power to the beaters until the beaters are unclogged and free to rotate with full application of driving power.

A particular feature is the dual input power takeoff shaft. In the described embodiment the right shaft drives the main conveyor forward on attachment of the power takeoff shaft. The power takeoff rotates counterclockwise. Where the power takeoff shaft is coupled to the left input shaft the main conveyor moves rearward. The pin 181 can be removed to prevent reverse movement of the cross conveyor as shown in FIG. 10 or a spring-loaded jaw clutch may be connected between the input shaft and the cross conveyor drive which reengages so the cross conveyor is not driven.

The two meshing spur gears on the input shafts may be of different sizes so that the main conveyor moves at a greater speed rearwardly than forwardly since rear unloading may be at a higher rate. The variable speed drive also provides an adjustment of the speed of the main conveyor for rear and front unloading.

Cooperating with the drives to reduce the torques during the forward discharge and particularly to reduce the starting torque is the novel structure of the beaters with stiff projections slicing through the piled crop. This reduces the load on the drives particularly the maximum loads. These advantages are attained at a lower cost not only in the beater structure but in the drives transmitting driving power to the beaters.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. On a forage wagon having a longitudinally extending main conveyor for delivery of crop material forwardly or rearwardly and a laterally extending cross conveyor for discharging forwardly delivered crop material to one side of the wagon;

a drive mechanism comprising two rotatably mounted input shafts, each having means for separately connecting said shafts to a power takeoff shaft and having means intercoupling said shafts to rotate said shafts in opposite directions, means for connecting one of said shafts to said main conveyor, means for connecting said other input shaft to said cross conveyor, and decoupling means between one of said input shafts and said cross conveyor for nonmovement of said cross conveyor on said main conveyor being driven for rearward discharge.

2. On a forage wagon as set forth in claim 1 wherein said two input shafts are first and second shafts and said first shaft is connected to said main conveyor and said second shaft is connected to said cross conveyor and said decoupling means is between said second shaft and said cross conveyor.

3. On a forage wagon as set forth in claim 2 wherein said means for coupling said input power takeoff shafts are first and second spur gears on said first and second input shafts, respectively, meshing to rotate said shafts in opposite direction.

4. On a forage wagon as set forth in claim 3, wherein said first gear is larger than said second gear to drive said main conveyor faster rearwardly than forwardly for a more rapid rearward discharge than forward discharge.

5. On a forage wagon as set forth in claim 1 wherein said means for driving said main conveyor includes a variable speed drive means for adjusting the speed of said main conveyor.

6. On a forage wagon as set forth in claim 1, wherein said means for driving said main conveyor comprises a transversely extending drive on the front of said wagon, a variable speed drive on the front of said wagon and having longitudinally extending input and output shafts with said input shaft connected to said transversely extending drive, gear means, and a main drive on the side of said wagon and connected to said gear means and said main conveyor.

7. On a forage wagon as set forth in claim 1, wherein an agitating and fluffing discharge feed means extending across the front of said wagon and a drive means are provided with said drive means on the front and side of said wagon and connected between one of said input shafts and said agitating and fluffing means.

8. On a forage wagon as set forth in claim 7 wherein said drive means includes a decoupling drive means for disconnecting said drive means from said input shafts.

9. On a forage wagon as set forth in claim 7 wherein said drive means includes a transverse drive on the front of said wagon coupled to one of said input shafts, first and second bevel gears with said first bevel gear coupled to said transverse drive means, a decoupling drive on the side of said wagon connected to said second bevel gear, and a feeder drive between said decoupling drive means and said agitating and fluffing feed means for driving said feed means on said decoupling drive being in drive transmitting condition.

10. On a forage wagon having a wheeled frame with a bottom, a main longitudinally extending conveyor along the bottom, a discharge conveyor extending laterally at the front end of the main conveyor for receiving cut crops therefrom and beaters rotatably mounted above the forward end of the main conveyor for dropping piled cut crops onto said discharge conveyor;

a drive mechanism comprising first means for driving said main conveyor, second means for driving said beaters, a variable speed drive having input and output shafts with said main conveyor drive means connected to said output shaft, two forwardly extending input shafts having meshing spur gears and individually connectable to a power takeoff shaft, discharge conveyor drive means for connecting said discharge conveyor to one of said input shafts for delivery of cut crops to one side of said wagon on connection of one of said input shafts to a power takeoff shaft, means for connecting said beater drive means and said input shaft of said variable speed drive to one of said input shafts for driving said main conveyor through said variably speed drive and for driving said beater drive means to drop piled crops on said discharge conveyor, and said discharge conveyor drive means having detachable means to prevent driving of said discharge conveyor when said other input shaft is connected to a power takeoff shaft and said main conveyor is driven in reverse to discharge crop material from the rear of the wagon.

11. On a forage wagon having a wheeled frame with a bottom, a front material receiving and discharge and a rear material discharge, a main conveyor extending along said bottom and movable forwardly or rearwardly for discharge of material at the front or rear, rotatably mounted beaters above said main conveyor at the front discharge, a discharge conveyor extending laterally at the front of the forage wagon for receiving cut crops from the main conveyor and beaters, drive mechanism comprising means for driving said beaters, means for driving said main conveyor, means for driving said discharge conveyor, means having two inputs separately connectable to a power takeoff shaft for delivery of power in opposite direction, first means for connecting said beater drive means and said main conveyor drive means to said two input means and second means for connecting said cross conveyor drive means to said two input means for driving said beaters, main conveyor and discharge conveyor on forward discharge and when a power take is connected to one of said inputs and means for detaching said cross conveyor drive from said input shaft when a power takeoff is connected to said other input for driving said main conveyor for rear discharge.

12. A rotatable beater transversely extending across the front of a forage wagon to agitate and fluff crop material passed forwardly for discharged comprising:
   beater bars extending longitudinally and spaced circumferentially around the beater, each bar having projections stamped therefrom with leading edges of thicknesses substantially less than the width and height of a respective projection and extending outwardly with the leading edge facing in the direction of rotation for cutting through crop material.

13. A beater as set forth in claim 12 wherein said projections extend radially.

14. A beater as set forth in claim 12 wherein said projections have ribbed portions extending outwardly from a respective bar to stiffen a respective projection.

15. A beater bar as set forth in claim 14 wherein said beater bars each has longitudinally extending central portions with said respective projections thereon and longitudinal edge portions at an angle to a respective portion to further stiffen said projections.

16. A beater as set forth in claim 12 wherein said projections are triangular in shape.